United States Patent Office 3,320,213
Patented May 16, 1967

3,320,213
SELF - EXTINGUISHING PHENOL-ALDEHYDE RESINS PREPARED BY REACTING PHENOL WITH HALOGEN-SUBSTITUTED AROMATIC ALDEHYDES
Harry A. Smith, Midland, Mich., assignor to The Dow Chemical Company, Midland, Mich., a corporation of Delaware
No Drawing. Filed Jan. 27, 1964, Ser. No. 340,545
10 Claims. (Cl. 260—55)

This invention relates to new and useful compositions of matter. More particularly, it is concerned with the preparation of novel phenol-aldehyde resins which are self-extinguishing and are useful where high resistance to flame is required.

It is an inherent property of those resins which do not contain nitrogen and which are composed substantially only of carbon, hydrogen and oxygen to be particularly susceptible to combustion. This is especially true of the phenolic class of resins, which will generally continue to support combustion after they have been exposed to flame. The combustibility of these resins is markedly disadvantageous in coating and molding applications where an extended surface of large area may be exposed to heat and flame.

It is, therefore, an object of the invention to provide novel, self-extinguishing phenol-aldehyde resins.

It is a further object to provide flame-resistant coating and molding compositions composed of phenol-aldehyde resins.

The foregoing objects and others which will become apparent from the following descriptions are accomplished in accordance with the invention by reacting a hydroxy aromatic compound such as phenol with a halogen-substituted aromatic aldehyde such as bromobenzaldehyde.

By the term "self-extinguishing" it is meant that the material is incapable of burning or sustaining a flame for more than a short time after it is separated from an open flame in which it has been heated and ignited. In other words, a composition is considered to be self-extinguishing if it stops burning shortly after a flame used to start its burning has been removed or the material is taken out of the flame.

Illustrative examples of halogen-substituted aromatic aldehydes which may be used for the preparation of the self-extinguishing polymers of the present invention include mono-, di-, and tribromobenzaldehyde, the di- and trichlorobenzaldehydes, and the alkyl, aryl and aralkyl halobenzaldehydes, such as mono- and dibromotolualdehyde, bromobiphenyl-aldehyde, bromobenzyl benzaldehyde, dichlorotolualdehyde and trichlorobiphenyl-aldehyde. Halogen-substituted aryl aldehydes useful in accordance wtih the present invention include those having the structural formula:

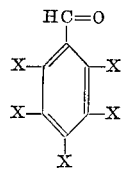

wherein X is a radical selected from the group consisting of hydrogen, alkyl, aryl, arylalkyl, alkoxy, aroxy, halogen and nitro radicals, at least one X radical being halogen.

Halogen-substituted aromatic aldehydes are known and may be prepared by halogenation of a corresponding toluene compound followed by oxidation of the halogenated toluene with chromic acid in an acetic anhydride solvent using standard procedures employed in the art.

The hydroxy aromatic compounds which can be reacted with the halogen-substituted aromatic aldehydes to produce the halogenated phenolic resins of the present invention are phenols which have only aromatic unsaturation and only one hydroxy group attached directly to the ring and may be either mono-, bi- or polynuclear phenols. Typical examples of phenols which may be employed in the practice of the present invention include phenol itself, $C_6H_5OH$, or its homologues such as the ortho-, meta- and para-cresols, the xylenols, etc., higher alkyl phenols such as metal-ethyl phenol, para-tertiary butyl phenol, para-tertiary amyl phenol, etc., aryl phenols such as the ortho-, meta- and para-phenyl phenols, the ortho-, meta- and para-benzyl phenols, phenethyl phenol, polynuclear phenols such as alpha- and beta-naphthol, and anthranol.

The reaction between the halogen-substituted aldehyde and the hydroxy aromatic compound may be carried out in the presence or absence of a catalyst. Advantageously, a catalyst is employed so as to reduce reaction time. Suitable catalysts include tertiary amines such as tri-n-butylamine, triethylenediamine, N-methyl morpholine, tetramethylethylenediamine and "Lewis" acids, i.e., compounds of acid reaction, such as $AlCl_3$, $SnCl_4$, $ZnCl_2$, boron halides and organic tin salts such as stannous 2-ethyl hexoate.

The reaction is preferably carried out in the absence of diluent, for the presence of diluent increases reaction time. Moreover, the absence of solvent enhances the reactivity of the monomers and promotes a continued polymerizing reaction.

The ratio of halogen-substituted aldehyde to the hydroxy aromatic compound used for the preparation of the resin may be considerably varied. When equimolar proportions of halogen-substituted aromatic aldehyde and hydroxy aromatic compound are employed to prepare the halogen-containing resin, the resultant resin is thermoplastic, fusible and soluble in a wide range of organic solvents such as acetone, methylene chloride and benzene and have melting points in the range of 60°–180° C. and are self-extinguishing.

These resins have a wide variety of uses. They may be artificially shaped, as molded or cast into self-supporting films. Their most valuable application, however, is is coating compositions because of their wide solubility in organic solvents from which they can be applied. The excellent water resistance, high melting points and self-extinguishing properties of the polymers make them especially applicable as coatings in hot, humid, atmospheres and areas in which flameproof materials are required, as for example, the coating of wood and cellulose board to increase their flame resistance. If a molar excess of halogen-substituted aromatic aldehyde is employed, as for example, 1.2 or more moles of halogen-substituted aromatic aldehyde for each mole of hydroxy aromatic compound are used to prepare the resin, the resultant resinous product is thermosetting, infusible and insoluble.

These thermosetting resins are useful as flame retardant molding compositions, adhesives and laminating resins for paper, glass fiber and related products.

The polymers are usually prepared by mixing the hydroxy aromatic material, the halogen-substituted aryl aldehyde and catalyst in a suitable reaction vessel. The reaction mixture is then heated to about 150° C. at atmospheric pressure or under vacuum. During the reaction, water is given off as a by-product and the ceasing of its evolution is a convenient determinant of the end of the reaction. This water is removed in order to obtain a high degree of polymerization. The reaction may be conducted at elevated temperatures ranging from about 100° C. to as high as the boiling point of the reactants for periods of time ranging from 5 to 72 hours or longer. Such reaction times are also dependent, as will be apparent to those skilled in the art, upon the catalyst utilized and the temperature employed for the reaction. If the temperature is less than 100° C., water of condensation is not removed from the reaction zone and reaction is incomplete. If the temperature is above the boiling point of the reactants, monomer may be unnecessarily removed and lost from the reaction.

While the invention is susceptible to considerable variation and modification in the manner of its practical application, particularly as regards the kind and amount of reactants and the conditions of reaction such as temperature and catalysts employed, the following examples will serve to illustrate how the polymers of the present invention may be prepared.

EXAMPLE I

To a flask equipped with an air condenser were charged 9.4 grams (0.100 mole) of phenol, 18.5 grams (0.100 mole) of p-bromobenzaldehyde, and 1.85 grams (0.01 mole) of tri-n-butylamine. The temperature of the reaction mixture was raised to 150° C. and the mixture heated for 72 hours and the effluent water collected. The reaction mixture was then cooled, washed with $H_2O$ to remove catalyst and dried in air. Twenty-six grams of reddish brown, glass-like, thermoplastic material was obtained in 99.2% yield which had a melting point of 115°–135° C. and a bromine content of 29.8%. A portion of the material was placed on a spatula and ignited in the flame of a microburner. Upon removal from the flame, the ignited material was immediately self-extinguished. The self-extinguishing resin was determined to be soluble in ethanol, methylene chloride, acetone, benzene and benzaldehyde and was insoluble in water and aqueous alkali solutions.

EXAMPLE II

To a flask equipped with an air condenser were charged 9.4 grams (0.100 mole) of phenol, 26.4 grams (0.100 mole) of 2,4-dibromobenzaldehyde and 1.85 grams (0.01 mole) of tri-n-butylamine. The temperature of the reaction mixture was raised to 150° C. and the mixture heated for 72 hours and the effluent water collected. The reaction mixture was then cooled, washed with $H_2O$ to remove catalyst and dried in air. Thirty-one grams of a reddish, glass-like thermoplastic material was obtained in 91.3% yield which had a melting point of 60°–82° C. and a bromine content of 45.4%. A portion of the material was placed on a spatula and ignited in the flame of a microburner. Upon removal from the flame, the ignited material was immediately self-extinguished. The self-extinguishing resin was determined to be soluble in ethanol, methylene chloride, acetone, benzene and benzaldehyde and was insoluble in water and aqueous alkali solutions.

EXAMPLE III

To a flask equipped with an air condenser were charged 9.4 grams (0.100 mole) of phenol, 52.8 grams (0.200 mole) of 2,4-dibromobenzaldehyde, and 1.85 grams (0.01 mole) of tri-n-butylamine. The temperature of the reaction mixture was raised to 150° C. and the mixture heated for 72 hours and the effluent water collected. The reaction mixture was then cooled, washed with $H_2O$ to remove catalyst and dried in air. The product obtained was thermosetting, infusible, insoluble and self-extinguishing.

EXAMPLE IV

To a flask equipped with an air condenser were charged 8.0 grams (0.0233 mole) of phenol, 2.2 grams (0.0233 mole) of 2,4,6-tribromobenzaldehyde, and 1.85 grams (0.01 mole) of tri-n-butylamine. The temperature of the reaction mixture was raised to 150° C. and the mixture heated for 72 hours and the effluent water collected. The reaction mixture was then cooled, washed with $H_2O$ to remove catalyst and dried in air. Eight and two-tenths grams of a reddish brown, glass-like material was obtained in 88.7% yield which had a melting point of 75°–100° C. and a bromine content of 63.7%. A portion of the material was placed on a spatula and ignited in the flame of a microburner. Upon removal from the flame, the ignited material was immediately self-extinguished. The self-extinguishing resin was determined to be soluble in ethanol, methylene chloride, acetone and benzaldehyde and was insoluble in water and aqeuous alkali solutions.

EXAMPLE V

To a flask equipped with an air condenser is charged 9.4 grams (0.100 mole) of phenol, 17.5 grams (0.100 mole) of 2,4-chlorobenzaldehyde, and 1.85 grams (0.01 mole) of tri-n-butylamine. The temperature of the reaction mixture is raised to 150° C. and the mixture heated for 72 hours and the effluent water collected. The reaction mixture is then cooled, washed with water to remove catalyst and dried in air. The resultant product thereby obtained is self-extinguishing when a sample of the ignited material is removed from the flame of a microburner.

What is claimed is:

1. A film-forming, self-extinguishing, resinous polymer obtained by heating, at reaction temperature between about 100° C. and the boiling point of the reactants, with evolution of water, a mixture of (a) a hydroxy aromatic compound having only aromatic unsaturation and only one hydroxy group attached directly to the aromatic ring and (b) a halogen-substituted aryl aldehyde of the formula:

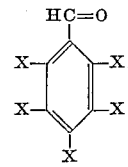

wherein X is a radical selected from the group consisting of halogen, hydrogen, alkyl, aryl, arylalkyl, alkoxy, aroxy and nitro radicals, at least one X radical being halogen.

2. The film-forming, self-extinguishing, resinous polymer of claim 1 wherein the hydroxy aromatic compound is phenol.

3. The film-forming, self-extinguishing, resinous polymer of claim 1 wherein the halogen-substituted aryl aldehyde is a bromobenzaldehyde.

4. The film-forming, self-extinguishing, resinous polymer of claim 1 wherein the halogen-substituted aryl aldehyde is a polychlorobenzaldehyde.

5. The film-forming, self-extinguishing, resinous polymer of claim 1 wherein the halogen-substituted aryl aldehyde is p-bromobenzaldehyde.

6. The film-forming, self-extinguishing, resinous polymer of claim 1 wherein the halogen-substituted aryl aldehyde is dibromobenzaldehyde.

7. The film-forming, self-extinguishing, resinous polymer of claim 1 wherein the halogen-substituted aryl aldehyde is tribromobenzaldehyde.

8. The film-forming, self-extinguishing, resinous polymer of claim 1 wherein the halogen-substituted aryl aldehyde is dichlorobenzaldehyde.

9. A process for producing film-forming, self-extinguishing synthetic polymer resins which comprises reacting one mole of a hydroxy aromatic compound having only aromatic unsaturation and only one hydroxyl group attached directly to the aromatic ring and at least one mole of a halogen-substituted aryl aldehyde of the formula:

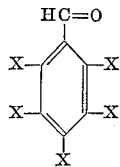

wherein X is a radical selected from the group consisting of halogen, hydrogen, alkyl, aryl, arylalkyl, alkoxy, aroxy and nitro radicals, at least one X radical being halogen, at 100–200° C. until water is eliminated and a resin forms.

10. A process for producing film-forming, self-extinguishing, synthetic polymer resins which comprises reacting in the presence of a catalyst one mole of a hydroxy aromatic compound having only aromatic unsaturation and only one hydroxyl group attached directly to the aromatic ring and at least one mole of a halogen-substituted aryl aldehyde of the formula:

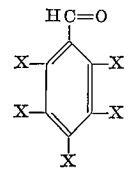

wherein X is a radical selected from the group consisting of halogen, hydrogen, alkyl, aryl, arylalkyl, alkoxy, aroxy and nitro radicals, at least one X radical being halogen, at 100–200° C. until water is eliminated and a resin forms.

References Cited by the Examiner

FOREIGN PATENTS 721,713   1/1955   Great Britain.

WILLIAM H. SHORT, *Primary Examiner.*

H. SCHAIN, *Assistant Examiner.*